United States Patent
Casaccia et al.

(10) Patent No.: US 8,145,228 B2
(45) Date of Patent: Mar. 27, 2012

(54) METHOD AND APPARATUS FOR CONTROLLING CALL REQUEST IN A COMMUNICATION SYSTEM

(75) Inventors: Lorenzo Casaccia, San Diego, CA (US); Sai Yiu Duncan Ho, San Diego, CA (US); Ragulan Sinnarajah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 09/853,322

(22) Filed: May 10, 2001

(65) Prior Publication Data

US 2002/0177432 A1   Nov. 28, 2002

(51) Int. Cl.
*H04W 72/00* (2009.01)
*H04B 7/00* (2006.01)

(52) U.S. Cl. .............. 455/452.1; 455/450; 455/409; 455/452.2

(58) Field of Classification Search .......... 455/450, 455/452.1–2, 62, 63.1, 511, 509; 370/342; 379/210.02, 196–200, 190, 221.03, 137, 379/138, 133
See application file for complete search history.

(56) References Cited

U.S. PATENT DOCUMENTS

| | | | |
|---|---|---|---|
| 5,280,630 A | 1/1994 | Wang | |
| 6,009,331 A | 12/1999 | Ueda | |
| 6,055,437 A * | 4/2000 | Riley et al. | 455/511 |
| 6,112,101 A * | 8/2000 | Bhatia et al. | 455/512 |
| 6,501,737 B1 * | 12/2002 | Mathal et al. | 370/252 |
| 6,628,637 B1 * | 9/2003 | Li et al. | 370/342 |
| 6,801,515 B1 * | 10/2004 | Ishikawa et al. | 370/342 |
| 2003/0027580 A1 * | 2/2003 | Goodjohn et al. | 455/453 |
| 2006/0111121 A1 * | 5/2006 | Ishikawa et al. | 455/453 |

FOREIGN PATENT DOCUMENTS

| | | |
|---|---|---|
| EP | 0 658 014 A1 | 6/1995 |
| JP | 05-095358 | 4/1993 |
| JP | 09-093646 | 4/1997 |
| JP | 09-275588 | 10/1997 |
| JP | 2000-175261 | 6/2000 |
| JP | 2000-308146 | 11/2000 |
| JP | 2000-308149 | 11/2000 |
| JP | 2000324038 A | 11/2000 |

(Continued)

OTHER PUBLICATIONS

Siwko et al. "Call Admission Control Policy for Capacity-Varying Networks with Stochastic Capacity Change Times," 2000 IEEE Global Telecommunications Conference. San Francisco, CA., Nov. 27-Dec. 1, 2000, IEEE Global Telecommunications Conference, New York, NY, US, vol. 2 of 4, Nov. 27, 2000, pp. 1150-1155.
International Search Report PCT/US02/015005-International Search Authority-European Patent Office-Jul. 3, 2003.

(Continued)

*Primary Examiner* — George Eng
*Assistant Examiner* — Marcos Torres
(74) *Attorney, Agent, or Firm* — Rupit M. Patel

(57) ABSTRACT

In a communication system (100), a method and apparatus provide for efficient control of call requests from mobile stations (102-104) to base station (101). Mobile station (102-104) receives an initial call request block probability from base station (101), determines an elapsed time from an effective time of the initial call request block probability, and adjusts the initial call request block probability based on an elapsed time. Mobile station (102-104) uses the adjusted initial call request to block call request.

25 Claims, 4 Drawing Sheets

FOREIGN PATENT DOCUMENTS

| | | |
|---|---|---|
| JP | 2001-060910 | 3/2001 |
| WO | 97/04606 | 2/1997 |
| WO | 99/67965 | 12/1999 |

OTHER PUBLICATIONS

3GPP2 C.S0002-A-1, "Physical layer Standard for cdma2000 spread spectrum systems", v2.0, Rel. A, Add. 1.

ETSI TS 125 211 V4.0.0, "Physical channels and mapping of transport channels onto physical channels (FDD)", 3GPP TS 25.211 v4,0.0, Rel. 4.

ETSI TS 125 212 V4.0.0, "Multiplexing and channel coding (FDD)"; 3GPP TS 25.212 v4.0.0, Rel. 4.

ETSI TS 125 213 V4.0.0, "Spreading and modulation (FDD)", 3GPP TS 25.213 v4.0.0, Rel. 4.

ETSI TS 125 214 V4.0.0, "Physical layer procedures", 3GPP TS 25.214 v4.0.0, Rel. 4.

TIA/EIA-95, "Mobile station-base station compatiility standard for dual-mode wideband spread spectrum cellular system".

Written Opinion—PCT/US02/015005, IPEA/US—Apr. 29, 2005.

* cited by examiner

METHOD AND APPARATUS FOR CONTROLLING CALL REQUEST IN A COMMUNICATION SYSTEM

BACKGROUND

1. Field

The present invention relates generally to the field of communications, and more specifically, to communications in a cellular communication system.

2. Background

A cellular communication system may operate in accordance with code division multiple access (CDMA) communication technique. Several CDMA systems have been in commercial operations for a number of years. In CDMA communication systems, a number of users in the same geographical area may choose to operate on a common carrier frequency. The signal from each user is encoded according to a unique assigned code. A receiver decodes each signal according to the assigned code. A receiver may receive signals from different users with a common carrier frequency. While a signal for one user is being decoded, the signals transmitted from all other users may be treated as interference. Excessive transmission by different users may cause interference for other users in addition to causing system overload at a base station. In a CDMA system, the power level of signals transmitted by different users of the system is controlled to control the interference level based on the system capacity. Moreover, for effective utilization of the channel resources in the CDMA communication system, the power level of each transmitted signal is controlled. The power level of each signal is controlled at the transmitter to maintain an adequate quality of reception at a receiving end. Other reasons, such as conserving battery power, for controlling power level of signals in a CDMA system are well known by one of ordinary skill in the relevant art.

Although the power level transmitted from each mobile station is controlled to maximize the use of the available channels, very often, more mobile stations may attempt to access the base station than the number of available channels. In such a case, some mobile stations may be denied access to the base station due to lack of available channels. Rejecting a request for a call has several negative effects. One effect in particular is the amount of processing and bandwidth at the base station allocated to process the rejected call. Another effect is use of the mobile station power to initiate such a call request without a success. Moreover, during call request attempt, the mobile station may gradually increase its transmit power level. The mobile station power level during the call request period may effect communications of other mobile stations.

To this end as well as others, there is a need for an effective control of call request in a communication system.

SUMMARY

In a communication system, a method and apparatus provide for efficient control of call requests from mobile stations to a base station. A mobile station receives an initial call request block probability from a base station, determines an elapsed time from an effective time of the initial call request block probability, and adjusts the initial call request block probability based on the elapsed time. The mobile station uses the adjusted initial call request probability to block or un-block a call request.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Figure 1:
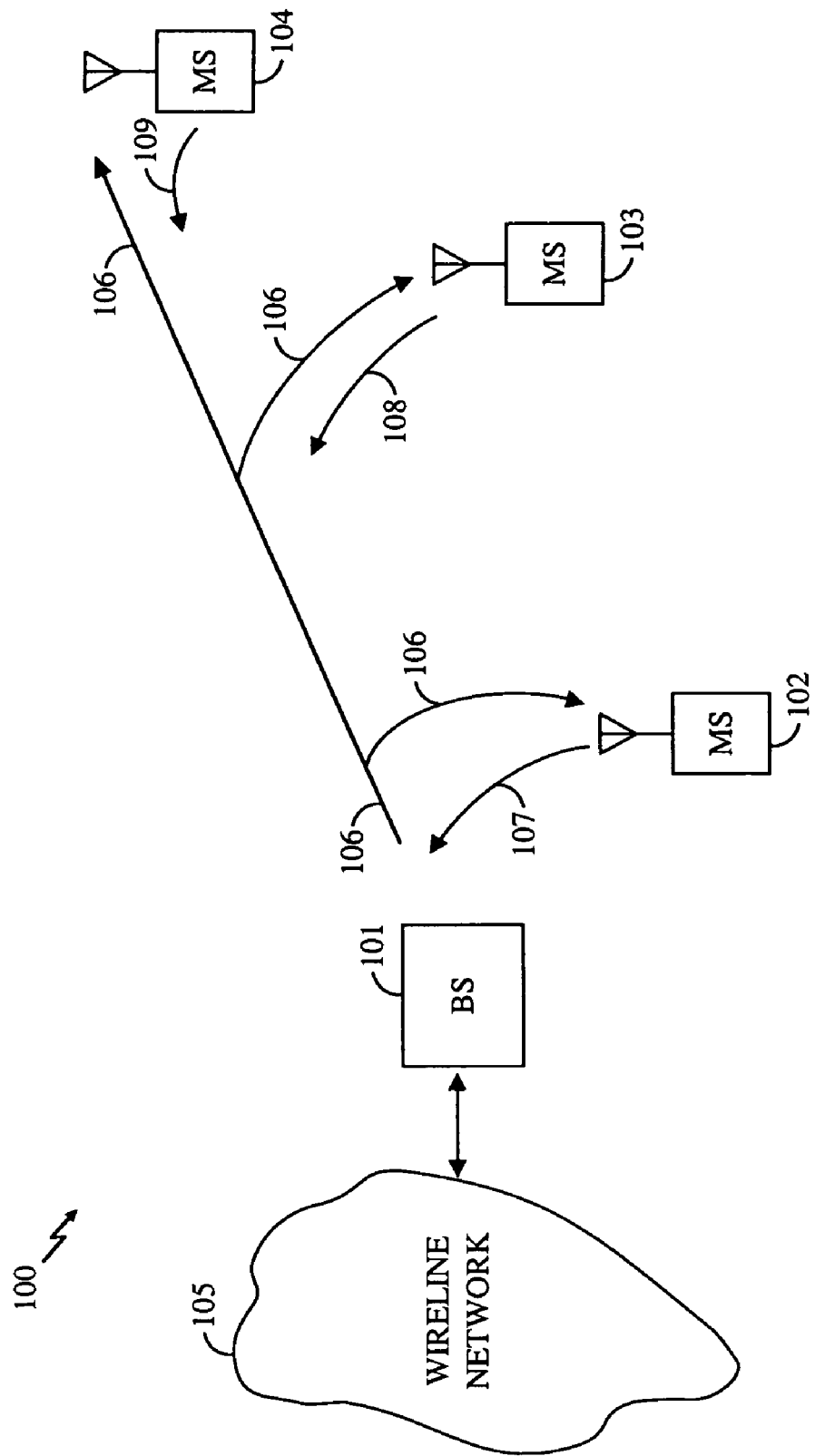
FIG. 1 illustrates a communication system capable of operating in accordance with various embodiments of the invention.

A system for wireless communications in accordance with the a code division multiple access (CDMA) technique has been disclosed and described in various standards published by the Telecommunication Industry Association (TIA). Such standards include the TIA/EIA-95 standard, TIA/EIA-IS-2000 standard, IMT-2000 standard, and WCDMA standard, all incorporated by reference herein. A copy of the standards may be obtained by accessing the world wide web at the address: http://www.cdg.org, or by writing to TIA, Standards and Technology Department, 2500 Wilson Boulevard, Arlington, Va. 22201, United States of America. The "$3^{rd}$ Generation Partnership Project" (3GPP) is embodied in a set of documents including Document No. 3G TS 25.211, 3G TS 25.212, 3G TS 25.213, and 3G TS 25.214, and known as the WCDMA standard; the "TIA/EIA/IS-95 Remote Station-base station Compatibility Standard for Dual-Mode Wideband Spread Spectrum Cellular System" is known as the IS-95 standard; the "TR-45.5 Physical Layer Standard for cdma2000 Spread Spectrum Systems" is known as the CDMA-2000 standard; each incorporated by reference herein. The specification generally identified as WCDMA specification, incorporated by reference herein, may be obtained by contacting 3GPP Support Office, 650 Route des Lucioles-Sophia Antipolis, Valbonne-France.

Generally stated, a novel and improved method and an accompanying apparatus provide for efficient control of call requests in a communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. The exemplary embodiment described herein is set forth in the context of a digital communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application may be represented by voltages, currents, electromagnetic waves, magnetic fields or particles, optical fields or particles, or a combination thereof. In addition, the blocks shown in each block diagram may represent hardware or method steps.

FIG. 1 illustrates a general block diagram of a communication system 100 capable of operating in accordance with any of the code division multiple access (CDMA) communication system standards. Generally, communication system 100 includes a base station 101 that provides communication links between a number of mobile stations, such as mobile stations 102-104, and between the mobile stations 102-104 and a wireline network 105. base station 101 may include a number of components, such as a mobile station controller, a base station controller, and a radio frequency transceiver. For simplicity, such components are not shown. base station 101 may also be in communication with other BSs (not shown.) base station 101 communicates with each mobile station 102-104 via a forward link. The forward link may be maintained by a forward link signal transmitted from base station 101. The forward link signals targeted for several mobile stations 102-104 may be summed to form a forward link signal 106. Each of the mobile stations 102-104 receiving forward link signal 106 decodes the forward link signal 106 to extract the information that is targeted for its user. At the receiving end, the receiver may treat as interference the portion of the received forward link signal 106 targeted for others.

mobile stations 102-104 communicate with base station 101 via a corresponding reverse link. Each reverse link is maintained by a reverse link signal, such as reverse link signals 107-109 for respectively mobile stations 102-104. base station 101 may also transmit a predefined series of data bits on a pilot channel via the forward link to all mobile stations to assist each mobile station in decoding the forward link signal 106. Each of the mobile stations 102-104 may transmit a pilot channel to base station 101. The pilot channel transmitted from a mobile station may be used for decoding the information carried by the reverse link signal transmitted from the same mobile station. The use and operation of a pilot channel are well known. A transmitter and a receiver for communicating via the forward and reverse links are included in each mobile stations 102-104, and base station 101.

Figure 2:
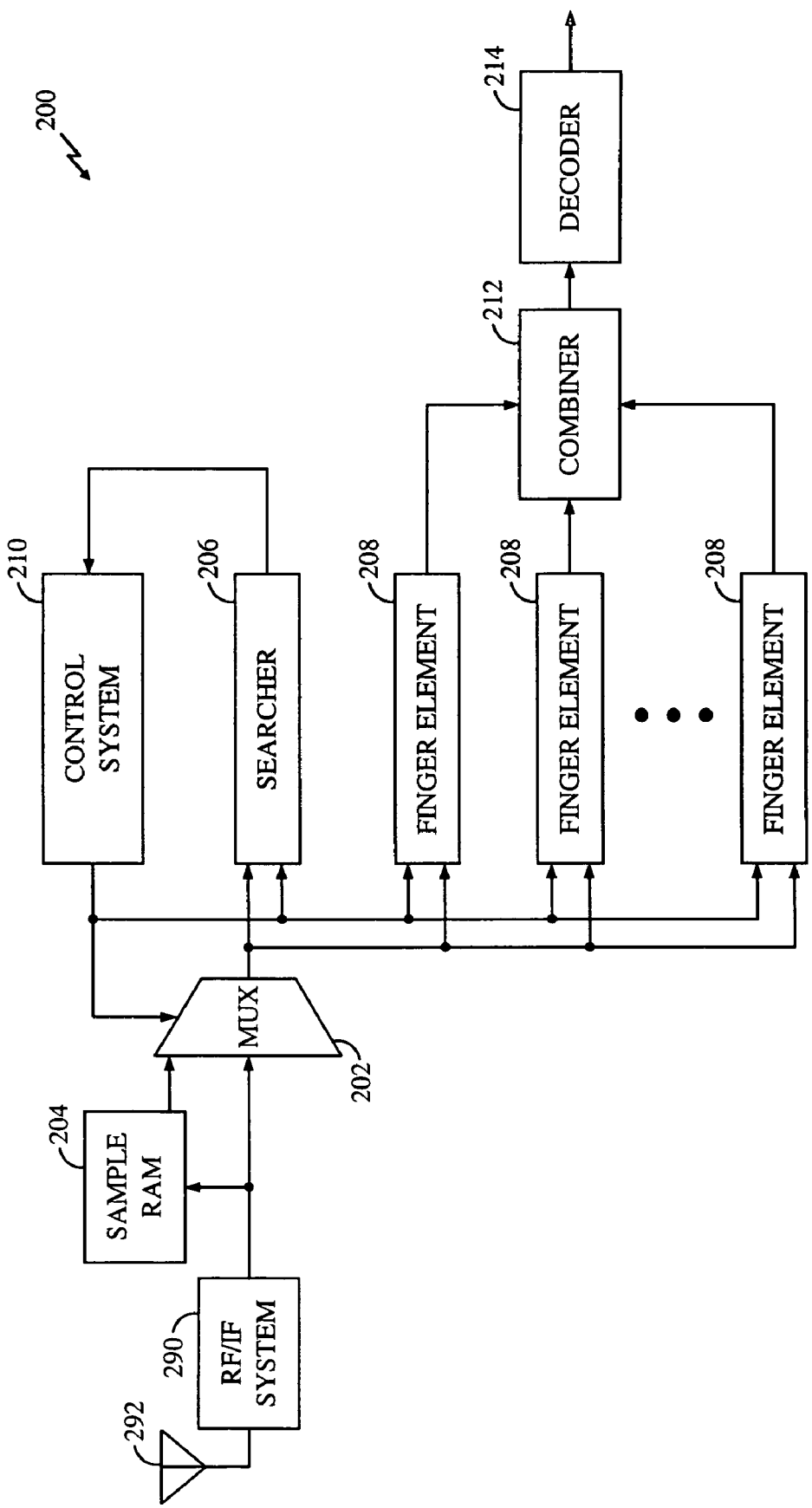
FIG. 2 illustrates a communication system receiver, for operation in a mobile station and a base station, capable of operating in accordance with various embodiments of the invention.

FIG. 2 illustrates a block diagram of a receiver 200 used for processing CDMA signals. Receiver 200 demodulates the received signal to extract the information carried by the received signal. Receive (Rx) samples are stored in RAM 204. Receive samples are generated by a radio frequency/intermediate frequency (RF/IF) system 290 and an antenna system 292. Antenna system 292 receives an RF signal, and passes the RF signal to RF/IF system 290. RF/IF system 290 may be any conventional RF/IF receiver. The received RF signals are filtered, down-converted, and digitized to form RX samples at baseband frequencies. The samples are supplied to a demultiplexer (demux) 202. The output of demux 202 is supplied to a searcher unit 206, and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit.

During operation, receive samples are supplied to demux 202. Demux 202 supplies the samples to searcher unit 206, and finger elements 208. Control unit 210 configures finger elements 208 to perform demodulation of the received signal at different time offsets based on search results from searcher unit 206. The results of the demodulation are combined and passed to decoder 214. Decoder 214 decodes the data, and outputs the decoded data.

In general for searching, searcher 206 may use non-coherent demodulation of a pilot channel to test timing hypotheses and phase offsets corresponding to various transmitting sources and multi-paths. The demodulation performed by finger elements 208 may be performed via coherent demodulation of other channels such as control and traffic channels. The information extracted by searcher 206 by demodulating a pilot channel may be used in finger elements 208 for demodulation of other channels. The searcher 206 and finger elements 208 may provide both pilot channel searching, and demodulation of control and traffic channels. The demodulation and searching can be performed at various time offsets. The results of the demodulation may be combined in combiner 212 before decoding the data transmitted on each channel. Despreading of the channels is performed by multiplying the received samples with the complex conjugate of the PN sequence and assigned Walsh function at a single timing hypothesis, and digitally filtering the resulting samples, often with an integrate and dump accumulator circuit (not shown). Such a technique is commonly known in the art. Receiver 200 may be used in base station 101 and mobile stations 102-104 for decoding the information on respectively reverse and forward links signals. base station 101 may employ several of receiver 200 to decode the information transmitted from several mobile stations at the same time.

Receiver 200 may also perform interference cancellation through a correlation process. The received samples, after being read from RAM 204, are passed through a correlation process for each received signal. The correlation process may collectively be described as the operations of searcher 206, finger element 208, and combiner 212. Since the received samples contain samples from the signals transmitted from more than one transmitting source, the correlation process may be repeated for each received signal. The correlation process for each received signal may be unique because each signal may require a different correlation parameters as of those found in operations of searcher 206, finger element 208, and combiner 212. Each signal may include a traffic channel and a pilot channel. The PN sequence assigned to the traffic channel and pilot channel carried by each signal may be different. The correlation process may include channel estimation, which includes estimating the channel fading characteristics based on the result of correlating with the pilot channel. The channel estimation information is used for correlating with the traffic channel. Each traffic channel is then decoded.

The result from each correlation process may pass through a decoding process in decoder 214. If the transmitted channel is encoded via a convolutional encoding process, decoding step 214 is performed according to the utilized convolutional code. If the transmitted channel is encoded via a turbo encoding process, decoding step 214 is performed according to the utilized turbo code.

Each signal may be decoded to provide enough information about whether a pass indicator is produced for each cyclic redundancy check (CRC) associated with each transmitted frame of data. Operation and use of CRC in a communication system are well known. If the CRC is passed, the decoded result of the channel associated with the passed CRC may be passed on for further receiving operation.

The signals received by base station 101 may be input to receiver 200. Antenna system 292 and RF/IF system 290 receive the signals from the mobile stations to produce the samples of the received signals. The received samples may be stored in RAM 204. Receiver 200 may incorporate a number of searchers 206, a number of finger elements 208, a number of combiners 212, and a number of decoders 214 for simultaneously performing the correlation process and the decoding process for all the signals received from different mobile stations. However, only one antenna system 292 and RF/IF system 290 may be necessary.

Each time a correlation process is started, searcher 206 and finger element 208 may start anew for determining non-coherent demodulation of a pilot channel to test timing hypotheses and phase offsets. Searcher 206, or finger element 208, or searcher 206 and finger element 208 in combination, may determine the signal to interference ratio (S/I) for each received signal. The ratio Eb/I may be synonymous with the ratio S/I. The ratio Eb/I is a measure of signal energy over interference per unit of a data symbol or data bit. Therefore, S/I and Eb/I may be interchangeable in some respects. The interference (I) may typically be defined as the power spectral density of interference and the thermal noise.

To control interference and maintain an adequate system capacity, the system controls the signal level transmitted from each transmitting source, or the data rate of the communication link, or both. Generally, each mobile station determines the needed reverse link power level to support both the traffic channel and the pilot channel. Various power control schemes for controlling power levels of signals transmitted from an mobile station in a communication system are known. One or more examples are described in the mobile station-base station Compatibility Standard for Wideband Spread Spectrum Cellular Systems, otherwise known as TIA/EIA-95 and TIA/EIA-2000 standards, incorporated by reference herein. The output power level of each mobile station is controlled by two independent control loops, open loop and closed loop. The open loop power control is based on the need of each mobile station to maintain an adequate communication link with the base station. Therefore, the mobile station closer to the base station needs less power than the mobile station further away. A strong receive signal at the mobile station indicates less propagation loss between the mobile station and the base station, and, thus, requires a weaker reverse link transmit power level. In the open loop power control, the mobile station sets the transmit power level of the reverse link based on independent measurements of S/I of at least one received channel, such as pilot, paging, sync, and traffic channels. The mobile station may make the independent measurement prior to power level setting on the reverse link.

Figure 3:
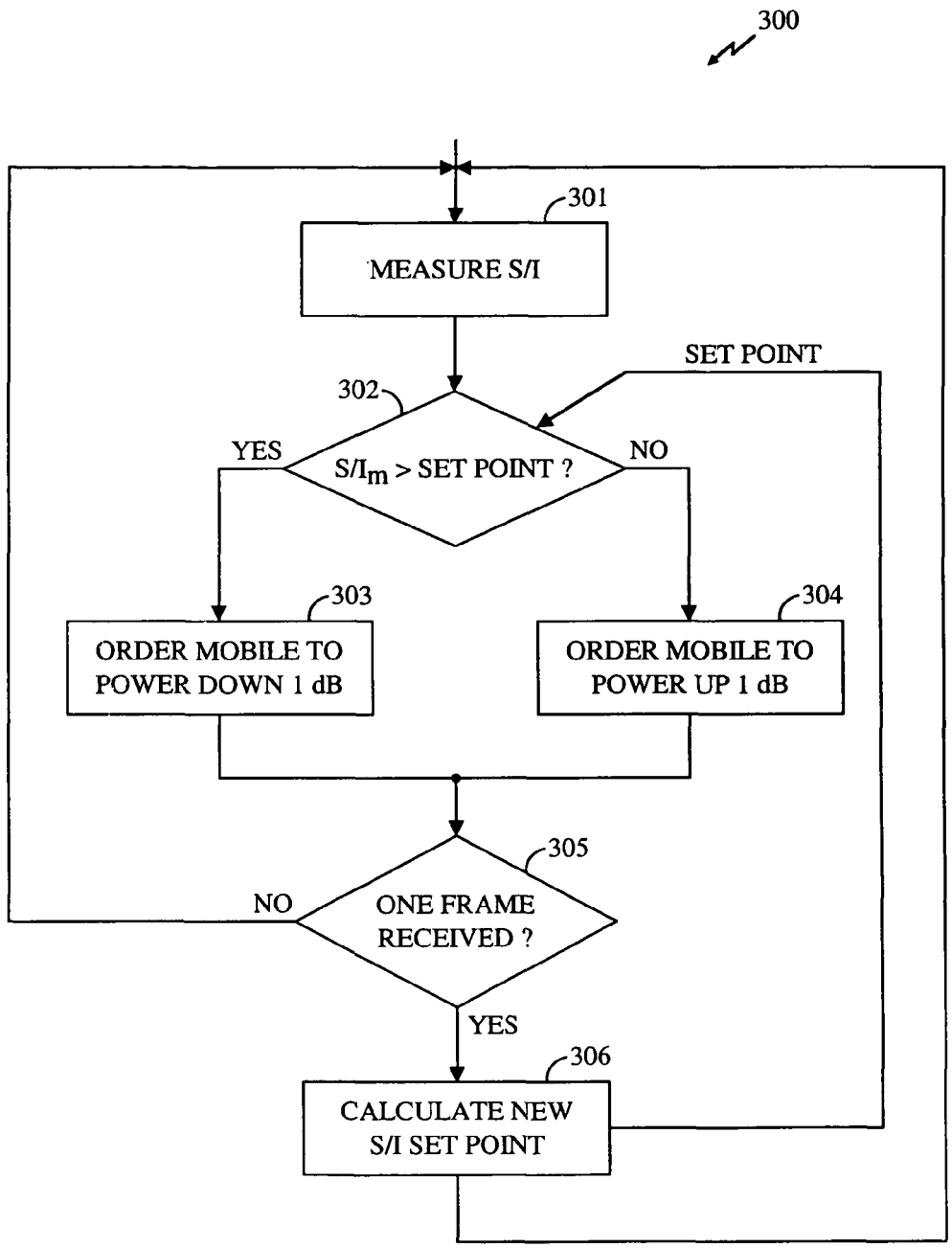
FIG. 3 illustrates a flow chart for controlling power level of a communication channel between a mobile station and a base station, capable of having adjusted operating parameters in accordance with various embodiments of the invention.

FIG. 3 illustrates a flow diagram 300 of an exemplary closed loop power control method. Operation of closed loop power control method 300 begins once a mobile station in communication system 100 seizes a forward link traffic channel. After the initial access attempt by the mobile station, the mobile station sets an initial reverse channel power level. The initial power level setting on the reverse link is then adjusted during the communication link via the closed loop power level control 300. The closed loop power control 300 operates with a faster response time than the open loop control. The closed loop power control 300 provides correction to the open loop power control. The closed loop power control 300 operates in conjunction with the open loop control during a traffic channel communication link to provide the reverse link power control with a large dynamic range.

To control the power level of the reverse link signal of a mobile station via the closed loop 300, base station 101 at step 301 measures the signal to interference ratio (S/I) of the reverse link signal transmitted from the mobile station. The measured S/I is compared with a set point S/I at step 302. The measured S/I may be in the form of Eb/I which is a ratio of bit energy over interference, and consequently, the set point may be in the same form. The set point is selected for the mobile station. The set point may be initially based on open loop power setting by the mobile station.

If the measured S/I is higher than the set point, at step 303, base station 101 orders the mobile station to power down the power level of its reverse link signal by an amount, for example 1 dB. When the measured S/I is higher than the set point, it indicates that the mobile station is transmitting on the reverse link at a signal power level higher than is needed to maintain an adequate reverse link communication. As a result, the mobile station is ordered to lower the signal power level of its reverse link to reduce the overall system interference. If the measured S/I is lower than the set point, at step 304, base station 101 orders the mobile station to power up the power level of its reverse link signal by an amount, for example 1 dB. When the measured S/I is lower than the set point, it indicates that the mobile station is transmitting on the reverse link at a signal power level lower than is needed to maintain an adequate reverse link communication. As a result of increasing the power level, the mobile station may be able to overcome the interference level and provide an adequate reverse link communication.

The operations performed at steps 302-304 may be referred to as the inner loop power control. The inner-loop power control keeps the reverse link (S/I) at the base station 101 as close as possible to its target threshold as provided by the set point. The target S/I is based on the set point selected for the mobile station. The power up or power down may be performed several times during a time frame. One time frame may be divided into 16 power control groups. Each power control group consists of several data symbols. The power up or power down command may be transmitted 16 times per frame. If one frame of data has not been received at step 305, the power control loop 300 continues to measure S/I of the reverse link signal during the next power control group at step 301. The process is repeated at steps 302-304 until at least one frame of data is received from the mobile station.

A single set point or target may not be satisfactory for all conditions. Therefore, the set point used at step 302 may also change depending on a desired reverse link frame error rate. If one frame of data has been received at step 305, a new S/I set point may be calculated at step 306. The new set point becomes the new S/I target for the mobile station. The new set point may be based on a number of factors including the frame error rate. For example, if the frame error rate is above a predetermined level, indicating unacceptable frame error rate, the set point may be raised to a higher level. By raising the set point to a higher level, the mobile station consequently increases its reverse link transmit power level via the comparison at step 302 and power up command at step 304. If the frame error rate is below a predetermined level indicating above an acceptable frame error rate, the set point may be lowered to a lower level. By lowering the set point to a lower level, the mobile station consequently decreases it reverse link transmit power level via the comparison at step 302 and power down command at step 303. The operations performed at steps 305-306, looping back from step 306 to step 302 to indicate a new set point, and looping back to step 301 for measuring the S/I of the new frames, may be viewed as the outer loop operation. The outer-loop power control may command once every frame, and the closed loop power control may command once every power control group. One frame and one power control group may be, respectively, 20 and 1.25 mSec long.

The system may also employ a forward link power control scheme to reduce interference. The mobile station communicates to the base station periodically about the voice and data quality. The frame error rate and quality measurements are reported to the base station via a power measurement report message. The message contains the number of frames received in error on the forward link during an interval. The power level of the forward link signal is adjusted based on the number of frame errors. Since such a quality measurement feedback is based on the frame error rate, such a mode of the forward link power control is much slower than reverse link power control. For fast response, a reverse link erasure bit may be used to inform the base station whether the previous frame was received with or without error. The channel power gain may be continuously adjusted while monitoring the message or the erasure bit as a way of controlling forward link power level.

For communication of data, the forward link may be transmitted to the mobile station at a fixed power level while adjusting the effective forward link data rate targeted for the mobile station. The data rate adjustment on the forward link when viewed for the overall system is a form of interference control. Note that the forward link power control is generally for controlling interference in a coverage area, and/or for sharing a limited communication resources. When the feedback quality measurement is indicating poor reception, the data rate may be lowered while keeping the power level constant to overcome the effect of the interference. The data rate may also be lowered to allow other mobile stations to receive forward link communication at a higher data rate.

According to at least one of the CDMA Spread Spectrum System standards, incorporated by reference herein, in addition to the open loop and closed loop power control schemes, the mobile station adjusts the output power level by attributes of a code channel as specified by the standard. In CDMA-2000, the mobile station sets the output power of the enhanced access channel header, the enhanced access channel data, and the reverse common control channel data relative to the output power level of the reverse pilot channel. The output power level of the reverse pilot channel is set by the open and closed loop power controls. The mobile station maintains a power level ratio between the code channel power level and the reverse pilot channel power level. The ratio may be defined by the data rate used in the code channel. Generally, a table provides the values for the ratio at different data rates. The ratio generally increases for higher data rates. A ratio equal to one or less than one may also be possible. At a ratio equal to one, the power level of the pilot channel as set by the power control loop 300 is equal to the power level of the code channel. During transmission of data on a traffic channel, the data rate and the traffic channel power level may be adjusted. The power level may be selected based on a relative power of the reverse link pilot. Once an allowable data rate is selected, a corresponding channel gain with respect to the reverse link pilot power level is used to set the traffic channel power level.

In data mode, a base station may be providing communication links to a large number of mobile stations at different data rates. For example, one mobile station in a forward link connected state may be receiving data at a low data rate, and another mobile station receiving at a high data rate. On the reverse link, the base station may be receiving a number of reverse link signals from different mobile stations. An mobile station based on an independent measurement may decide and request a desired data rate from the base station. The desired forward link data rate may be communicated to the base station via a data rate control (DRC) channel. The data rate may also be selected by the base station based on certain metrics. The metrics may include the transmit power level of the power control sub-channel and/or power level of one or more forward traffic channels. The base station attempts to provide a forward link data transfer at the requested data rate.

On the reverse link, the mobile station may autonomously select a reverse link data rate from a number of possible reverse link data rates. The selected data rate may be communicated to the base station via a reverse rate indicator channel. The mobile station may request a desired data rate or request a non-specified data rate. The base station in response may determine a data rate that the mobile station may use. The base station communicates to the mobile station at the determined data rate. The determined data rate may be used for a limited duration. The duration may be determined by the base station. Each mobile station may also be limited to a predetermined grade of service. A grade of service may limit the maximum available data rate on the forward and/or reverse links. Moreover, the communication of data may not be continuous in a way that, perhaps, voice data are communicated. A receiver may be receiving packets of data at different intervals. The interval for different receiver may be different. For example, a receiver may be receiving data sporadically while another receiver may be receiving data packets within short time intervals.

Communication of data at high data rates takes a greater transmit/receive signal power level than at low data rates. The forward and reverse links may have similar data rate activities in the case of voice communications. The forward and reverse links data rates may be limited to low data rates since the voice information frequency spectrum is limited. Possible voice data rates are commonly known and described in a code division multiple access (CDMA) communication system standard such as IS-95 and IS-2000, incorporated by reference herein. For data communications, however, the forward and reverse links may not have similar data rates. For example, an mobile station may be retrieving a large data file from a database. In such a case, the communication on the forward link is predominantly occupied for transmission of data packets. The data rate on the forward link may reach 2.5 Mbps in a data mode. The data rate on the forward link may be based on a data rate request made by the mobile station. On the reverse link, the data rate may be lower, and may range from 4.8 to 153.6 Kbps.

Despite the power control scheme between the mobile stations 102-104 and the base station 101, some call requests may be denied due to system capacity overload. The capacity overload condition may be for a finite duration. The growth of data services has placed a condition of traffic congestion at the packet network, especially a gateway to an IP network, incorporated in wireline network 105. A call request control as a means for controlling traffic is highly desirable. As such, an access control based on call type (ACCT) may be used in communication system 100. For a call type to be blocked, the network specifies a percentage "p" of calls to be blocked. The percentage of the calls to be blocked may be associated with certain types of calls, such as calls for data communication. When a mobile station desires to make a call request, the mobile station decides whether the type of the call is of a type being controlled. If the call is being controlled, mobile station performs a random test. The random test produces a number between zero and one, for example. The number is compared to the call block probability. If the number is lower than the call block probability, the call request may be blocked at the mobile station. If the number is higher than the call block probability, the call request is initiated at the mobile station. The call request is blocked with a probability of "p". In this example, by repeatedly attempting to originate a call, a mobile station user can overcome the ACCT mechanism, and initiate a call request.

In another example, mobile stations may be grouped according to their call origination block types. If the network desires to block a certain percentage of call originations, the base station 101 signals over the air via appropriate messaging the selected groups of the mobile stations to be blocked.

When a mobile station desires to make a call origination, mobile station checks whether it belongs to the selected groups. If the mobile station belongs to one of the selected groups, the call origination from the mobile station at the mobile station is blocked. To ensure fairness and not to block only a specific group of mobile stations for a long period of time, the blocked groups may be changed. A new set of the mobile station groups are created and communicated to the mobile stations over the air. Such a scheme requires periodic messaging over the air. Periodic messaging to the mobile stations affects the battery life of all mobile stations since the mobile stations need to update their configuration information to prevent call origination. In another example, the base station may communicate to the mobile stations a wait delay "D", in addition to the call blocking probability "p" When mobile stations determine that their call originations should be blocked, the mobile stations attempt to delay the call origination until a period of time substantially equal to time D has passed.

The call originations from all mobile stations may be blocked with the same probability. Such a call origination block achieves the desired reduced throughput at the beginning of the ACCT-in-effect period. However, the throughput increases with time, even during the ACCT-in-effect period. For example, the current throughput of the system may be 100 calls/sec, and the network desires to reduce the call originations to 60 calls/s (i.e. 60% of the original throughput). If the network sets p=0.6, then in the beginning, the throughput is reduced to 60 calls/s. The throughput, however, may increase from that point on. A reason for this behavior is that the calls that are initially blocked contribute to the total offered load in a subsequent period, and, hence, the total number of call originations in the next period may be larger than 100 calls/s. Each period may be substantially equal to time D.

A number of "N" incoming calls may be distributed over a time period "T". The desired throughput in time period "T" may be equal to (1-p)N. The time period T may be divided in units of time with a time duration equal time "D". A delay interval D<T is determined. Note that if D>T, then none of the blocked calls have a chance to retry within the ACCT-in-effect period. A graphical representation is as following:

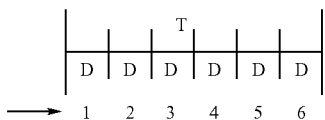

The number of the incoming calls per unit of time may be equal to ND/T, and the desired throughput per unit of time may be equal to (1-p)ND/T. The following Table shows the total throughput during each time unit. As the time passes, the throughput increases and eventually reaches ND/T (i.e. which is the original throughput without ACCT).

| Time | Throughput |
|---|---|
| 1 | $(1-p)\frac{ND}{T}$ |
| 2 | $(1-p)\frac{ND}{T} + p(1-p)\frac{ND}{T}$ |
| 3 | $(1-p)\frac{ND}{T} + p(1-p)\frac{ND}{T} + p^2(1-p)\frac{ND}{T}$ |
| 4 | $(1-p)\frac{ND}{T} + p(1-p)\frac{ND}{T} + p^2(1-p)\frac{ND}{T}$ |
| ... | ... |
| i | $\sum_{k=o}^{i-1} p^k(1-p)\frac{ND}{T} = (1-p)\frac{ND}{T}\frac{1-p^i}{1-p} = \frac{ND}{T}(1-p^i) \cong \frac{ND}{T}$ |

In accordance with various embodiments, the mobile stations autonomously may adapt the blocking probability. Specifically, each mobile station 102-104 utilizes an increasing value for blocking probability to counter the effect of increasing throughput and keep the effective throughput constant at the desired level. For example, if a number of "N" incoming calls are distributed over a time period "T", and the desired throughput in the time period T is equal to (1-p)N, the time period T may be divided into units of time with an equal duration "D". Therefore, the incoming calls per unit of time may be equal to ND/T, and the desired throughput per unit of time may be equal to (1-p)ND/T. During each unit of time D, a call origination may be blocked by the mobile station with probability p(b), and delayed for a time D. The base station 101 broadcasts the time unit "D" and "p" to all mobile stations 102-104. The probability p(b) may be computed and updated autonomously by each mobile station 102-104 at every unit of time D. The computation may be according to the following iteration:

$$k_1 = 1$$

$$p(b)_1 = 1 - \frac{1-p}{k_1}$$

$$k_2 = p(b)_1 \cdot k_1 + 1$$

$$p(b)_2 = 1 - \frac{1-p}{k_2}$$

$$...$$

$$k_i = p(b)_{i-1} \cdot k_{i-1} + 1$$

$$p(b)_i = 1 - \frac{1-p}{k_i}$$

The base station needs to signal the time at which ACCT is turned on as part of the ACCT information such that each mobile station before originating a call request may calculate the exact value for the blocking probability. Using the system time and ACCT turned-on time, the mobile station may calculate a new value of blocking probability. After time T, to ensure a smooth transition from $p(b)_{T/D}$ to U, p(b) may be multiplied with a parameter α, until it reaches a value p0, at which point p(b) will be set to zero and the iteration will stop ϵ[0,1]; at each unit of time:
    p(b)=p(b)* α
    p(b)<p0
yes: p(b)=0 and STOP
    no: go to 1

Figure 4:
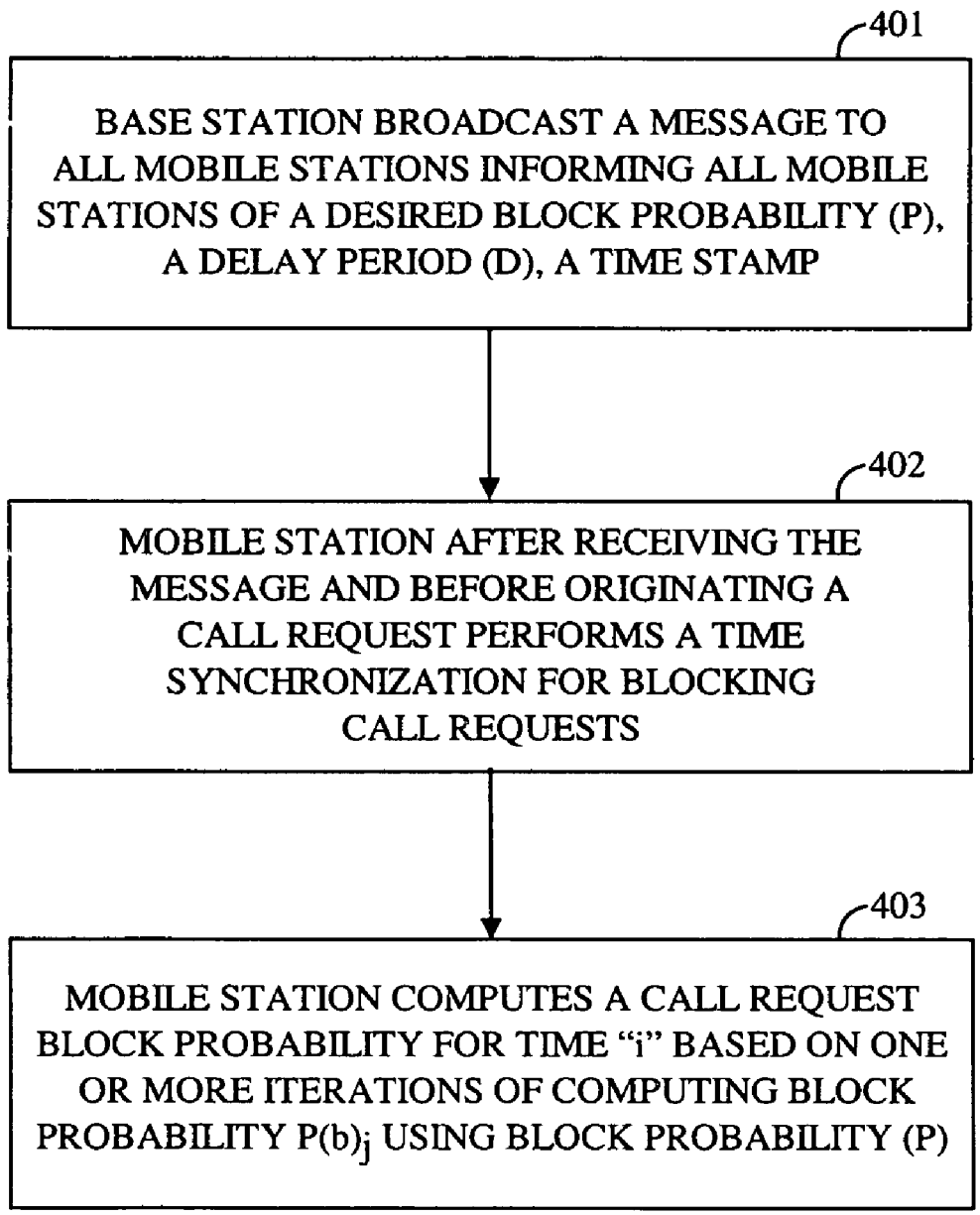
FIG. 4 illustrates a flow chart used for controlling call requests from mobile stations.

Referring to FIG. 4, a flow chart 400 outlines one or more steps necessary for an exemplary implementation for blocking call requests to maintain an acceptable call request load at base station 101. base station 101 transmits a message, at step 401, possibly in a form of a broadcast message, to all mobile stations 102-104. The message may contain at least an information indicating the probability of block (p), a delay period (D), and a time stamp (timestamp). At step 402, after receiving the message, each mobile station before making a call request attempts to perform a time synchronization for blocking a call request. The time synchronization may be for time "i". The time "i" may be equal to the current time minus the time stamp divided over the time delay period plus one, i=(time−timestamp)/D+1. The value of "i" indicates how many periods "D" has elapsed since the time stamp. If "i" is more than one, the block probability is not the same as the block probability (p). The mobile station then performs a call request block probability for time "i" at step 403. Since one or more periods of length "D" may have passed since the timestamp in the broadcast message, one or more iterations may be performed. For example, if the elapsed period from the time stamp is equal to three, three iterations may be performed. The iteration may be shown by the following:

$$k_1 = 1$$
$$p(b)_1 = 1 - \frac{1-p}{k_1}$$
$$k_2 = p(b)_1 \cdot k_1 + 1$$
$$p(b)_2 = 1 - \frac{1-p}{k_2}$$
$$\ldots$$
$$k_i = p(b)_{i-1} \cdot k_{i-1} + 1$$
$$p(b)_i = 1 - \frac{1-p}{k_i}$$

For example if "i" is equal to three and P is equal to 0.3, the iteration may be performed until p(b)3 is calculated. The first iteration, the p(b)1 is equal to (p)=0.3. In the second iteration, the p(b)2 is equal to 0.46, and, in the last iteration, the p(b)3 is equal to 0.636. In the second and third iterations, the block probability has increased from the initial block probability of 0.3. More call requests at the mobile stations may be blocked as time elapses. If a mobile station is attempting to make a call request during the third period (i=3), the randomly generated number at the mobile station should be higher than 0.636, and not 0.3. The mobile station at time "i=3" decides whether the call request block probability 0.636 is acceptable before making the call request. The base station 101 may transmit another message to start the call block algorithm at the mobile station after some time. When the new message is arrived, the call block probability at the mobile station may not immediately change. The change may be implemented via a gradual process.

Therefore, the mobile stations do not make a call request based on the initial call probability. As such, the mobile stations conserve their power when a call request has a better chance of being accepted at the base station. Moreover, the mobile stations do not unnecessarily transmit power during call requests that have higher probability of being denied at the base station. The results, in at least one aspect, include increasing in the system capacity to accept successful call requests. In case of a call request for a high priority call, such as emergency (911) calls, the mobile station may ignore the call request block process, and allow the emergency call request to be made.

Generally speaking, in accordance with various embodiments, in communication system 100, a method for blocking a call request may be performed. The method may include receiving an initial call request block probability. After, determining an elapsed time from an effective time of the initial call request block probability, the initial call request block probability may be adjusted based on an elapsed time. The adjustment may be decreasing the initial call request block probability. The adjusted initial call request may be used to block a call request at a mobile station 102-104 in the communication system 100. A time stamp associated with the initial call request block probability may be received and used for determining the elapsed time. An effective call request block termination time may also be received. A call request block performed based on the adjusted initial call request block probability may be terminated in a gradual process from the effective call request block termination time. The adjusted initial call request block probability may allow fewer number of mobile stations to initiate call requests than a number of mobile stations allowed to initiate call requests at a time of the initial call request block probability. A time period value may be received. The adjustment of the initial call block probability may occur at least once during a time period substantially equal to the time period value.

The receiver 200 may be configured for receiving the initial call request block probability. The processor (control system) 210 may be configured for determining the elapsed time from the effective time of the initial call request block probability, and adjusting the initial call request block probability based on the elapsed time. Processor 210 further may be configured for using the adjusted initial call request to block a call request at a mobile station 102-104 in communication system 100. Receiver 200 further may be configured for receiving a time stamp associated with the initial call request block probability, and the processor further may be configured for using the time stamp for determining the elapsed time. Receiver 200 further may be configured for receiving an effective call request block termination time, and the processor further may be configured for terminating a call request block performed based on the adjusted initial call request block probability in a gradual process from the effective call request block termination time. The adjusted initial call request block probability allows fewer number of mobile stations 102-104 to initiate call requests than a number of mobile stations 102-104 allowed to initiate call requests at a time of the initial call request block probability. Receiver 200 further may be configured for receiving a time period value, wherein the adjusting of the initial block probability occurs at least once during a time period substantially equal to the time period value. Receiver 200 as configured in accordance with various aspects may be incorporated in mobile stations 102-104. Base station 101 may be transmitting the initial call request block probability, time stamp, and the value for the time period. In addition, the base station 101 may transmit the termination time.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method for blocking a call request comprising:
   receiving at a mobile station an initial call request block probability, an effective time stamp of the initial call request block probability, and a time period value;
   determining at the mobile station an elapsed time from the effective time stamp; and
   adjusting at the mobile station said initial call request block probability at least once every time period value based on said elapsed time determined within the mobile station, said adjusted call request block probability identifying when the mobile station blocks a call request by foregoing origination of the call request.

2. The method as recited in claim 1 wherein said adjusting includes decreasing said initial call request block probability.

3. The method as recited in claim 1 further comprising:
   using said adjusted initial call request block probability to block a call request at the mobile station in said communication system.

4. The method as recited in claim 1 further comprising:
   receiving a time stamp associated with said initial call request block probability; and
   using said time stamp for determining said elapsed time.

5. The method as recited in claim 1 further comprising:
   receiving an effective call request block termination time; and
   terminating a call request block performed based on said adjusted initial call request block probability in a gradual process from said effective call request block termination time.

6. The method as recited in claim 1 wherein said adjusted initial call request block probability allows fewer number of mobile stations to initiate call requests than a number of mobile stations allowed to initiate call requests at a time of said initial call request block probability.

7. The method as recited in claim 1 further comprising:
   receiving a time period value, wherein said adjusting occurs at least once during a time period substantially equal to said time period value.

8. In a communication system, an apparatus comprising:
   a receiver configured for receiving at the apparatus an initial call request block probability, an effective time stamp of the initial call request block probability, and a time period value; and
   a processor configured for determining at the apparatus an elapsed time from the effective time stamp, and adjusting at the apparatus said initial call request block probability at least once every time period value based on said elapsed time determined within the apparatus, said adjusted call request block probability identifying when the mobile station blocks a call request by foregoing origination of the call request.

9. The apparatus as recited in claim 8 wherein said processor further configured for using said adjusted initial call request block probability to block a call request at the apparatus in said communication system.

10. The apparatus as recited in claim 8 wherein said receiver further configured for receiving a time stamp associated with said initial call request block probability, and said processor further configured for using said time stamp for determining said elapsed time.

11. The apparatus as recited in claim 8 wherein said receiver further configured for receiving an effective call request block termination time, and said processor further configured for terminating a call request block performed based on said adjusted initial call request block probability in a gradual process from said effective call request block termination time.

12. The apparatus as recited in claim 8 wherein said adjusted initial call request block probability allows fewer number of apparatus to initiate call requests than a number of apparatus allowed to initiate call requests at a time of said initial call request block probability.

13. The apparatus as recited in claim 8 wherein said receiver further configured for receiving a time period value, wherein said adjusting occurs at least once during a time period substantially equal to said time period value.

14. A communication system comprising:
   a mobile station configured for receiving at the mobile station an initial call request block probability, an effective time stamp of the initial call request block probability, and a time period value from a base station, determining at the mobile station an elapsed time from the effective time stamp, and adjusting at the mobile station said initial call request block probability at least once every time period value based on said elapsed time determined within the mobile station, said adjusted call request block probability identifying when the mobile station blocks a call request by foregoing origination of the call request.

15. The communication system as recited in claim 14 wherein said mobile station is further configured for using said adjusted initial call request block probability to block a call request.

16. The communication system as recited in claim 14 wherein said mobile station is further configured for receiving, from said base station, a time stamp associated with said initial call request block probability, and using said time stamp for determining said elapsed time.

17. The communication system as recited in claim 14 wherein said mobile station is further configured for receiving, from said base station, an effective call request block termination time, and terminating a call request block performed based on said adjusted initial call request block probability in a gradual process from said effective call request block termination time.

18. The communication system as recited in claim 14 wherein said mobile station is further configured for receiving, from said base station, a time period value, wherein said adjusting occurs at least once during a time period substantially equal to said time period value.

19. A mobile station comprising:
- a receiver configured for receiving at the mobile station an initial call request block probability, an effective time stamp of the initial call request block probability, and a time period value; and
- a processor configured for determining at the mobile station an elapsed time from the effective time stamp, and adjusting at the mobile station said initial call request block probability at least once every time period value based on said elapsed time determined within the mobile station, said adjusted call request block probability identifying when the mobile station blocks a call request by foregoing origination of call request.

20. The apparatus as recited in claim 19 wherein said processor further configured for using said adjusted initial call request block probability to block or unblock a call request at said mobile station.

21. In a communication system, an apparatus comprising:
- a receiver configured for receiving at the mobile station an initial call request block probability, an effective time stamp of the initial call request block probability, and a time period value, wherein the initial call request block probability is a percentage of calls to be blocked as specified by a network element; and
- a processor configured for determining at the mobile station an elapsed time from the effective time stamp, wherein the block probability is determined by a network element and adjusting at the mobile station said initial call request block probability at least once every time period value based on said elapsed time determined within the mobile station, said adjusted call request block probability identifying when the mobile station blocks a call request by foregoing origination of the call request.

22. The apparatus as recited in claim 21, wherein said processor is further configured to use said adjusted initial call request block probability to block a call request.

23. A method for blocking a call request at a mobile station, the method comprising:
- receiving at the mobile station an initial call request block probability, the initial call request block probability being a percentage of calls to be blocked as specified by a network element;
- receiving at the mobile station a time stamp and a time period associated with the received initial call request block probability;
- determining within the mobile station an elapsed time from an effective time of said initial call request block probability using the received time stamp;
- iteratively adjusting the initial call request block probability, the number of iterations being based on the ratio of the elapsed time to the received time period, said adjusted call request block probability identifying when the mobile station blocks a call request by foregoing origination of the call request;
- generating a random number by the mobile station between minimum and maximum allowed values associated with the initial call request block probability; and
- blocking the call request at the mobile station based on a comparison of the randomly generated number and the adjusted initial call request block probability.

24. In a communication system, an apparatus for blocking a call request comprising:
- means for receiving at a mobile station an initial call request block probability, an effective time stamp of the initial call request block probability, and a time period value;
- means for determining at the mobile station an elapsed time from the effective time stamp; and
- means for adjusting at the mobile station said initial call request block probability at least once every time period value based on said elapsed time determined within the mobile station, said adjusted call request block probability identifying when the mobile station blocks a call request by foregoing origination of the call request.

25. A non-transitory storage medium having computer-executable instructions encoded thereon for performing a method for blocking a call request, the method comprising:
- receiving at a mobile station an initial call request block probability, an effective time stamp of the initial call request block probability, and a time period value;
- determining at the mobile station an elapsed time from the effective time stamp; and
- adjusting at the mobile station said initial call request block probability at least once every time period value based on said elapsed time determined within the mobile station, said adjusted call request block probability identifying when the mobile station blocks a call request by foregoing origination of the call request.

* * * * *